United States Patent [19]

Yokouchi et al.

[11] Patent Number: 5,022,063
[45] Date of Patent: Jun. 4, 1991

[54] MULTIPLE-MODE SCANNING AND BEAM CURRENT CONTROL X-RAY TV APPARATUS

[75] Inventors: Hisatake Yokouchi, Tokyo; Yoichi Onodera, Hachioji; Takakazu Funo, Tokyo; Masayuki Tsuneoka, Kashiwa, all of Japan

[73] Assignee: Hitachi Medical Corporation, Tokyo, Japan

[21] Appl. No.: 468,692

[22] Filed: Jan. 23, 1990

[30] Foreign Application Priority Data

Jan. 25, 1989 [JP] Japan ................. 01-013952

[51] Int. Cl.$^5$ .......................... H05G 1/64; H04N 5/32
[52] U.S. Cl. ........................ 378/99; 358/111; 378/116
[58] Field of Search ............... 378/111, 112, 114, 115, 378/116, 91, 95; 358/111

[56] References Cited

U.S. PATENT DOCUMENTS

| | | | |
|---|---|---|---|
| 3,869,602 | 3/1975 | Sezaki et al. | 358/111 |
| 4,013,833 | 3/1977 | Zimmerman | 358/111 |
| 4,204,225 | 5/1980 | Mistretta | 358/111 |
| 4,706,268 | 11/1987 | Onodera | 378/111 |
| 4,802,002 | 1/1989 | Plut et al. | 358/111 |
| 4,809,071 | 2/1989 | Yokouchi et al. | 358/111 |
| 4,881,124 | 11/1989 | Yokouchi et al. | 358/111 |

FOREIGN PATENT DOCUMENTS 0180284 9/1985 Japan.

*Primary Examiner*—Carolyn E. Fields
*Assistant Examiner*—Kim-Kwok Chu
*Attorney, Agent, or Firm*—Antonelli, Terry, Stout & Kraus

[57] ABSTRACT

In a real-time digital radiographic apparatus, an image is picked up by means of a TV camera. In a fluoroscopic monitoring mode, an output of the TV camera is displayed on a display in real time. In a radiographic imaging mode, the output of the TV camera is A/D converted, subjected to a necessary image processing and held as image data for diagnosis. In the fluoroscopic monitoring mode, a beam scanning for an image pickup tube corresponding to an NTSC system is performed whereas in the radiographic imaging mode a high-density and low-speed beam scanning can be selected in which the number of scanning lines is increased and the frame rate is lowered. In order to suppressing the lowering of the maximum signal current derivable from the image pickup tube which may occur in such a high-resolution scanning, a target voltage of the image pickup tube in a high-resolution mode is changed to a value higher than a standard value of the target voltage, thereby acquiring an image which has a wide dynamic range and a high S/N ratio.

17 Claims, 8 Drawing Sheets

1ST MODE

2ND MODE

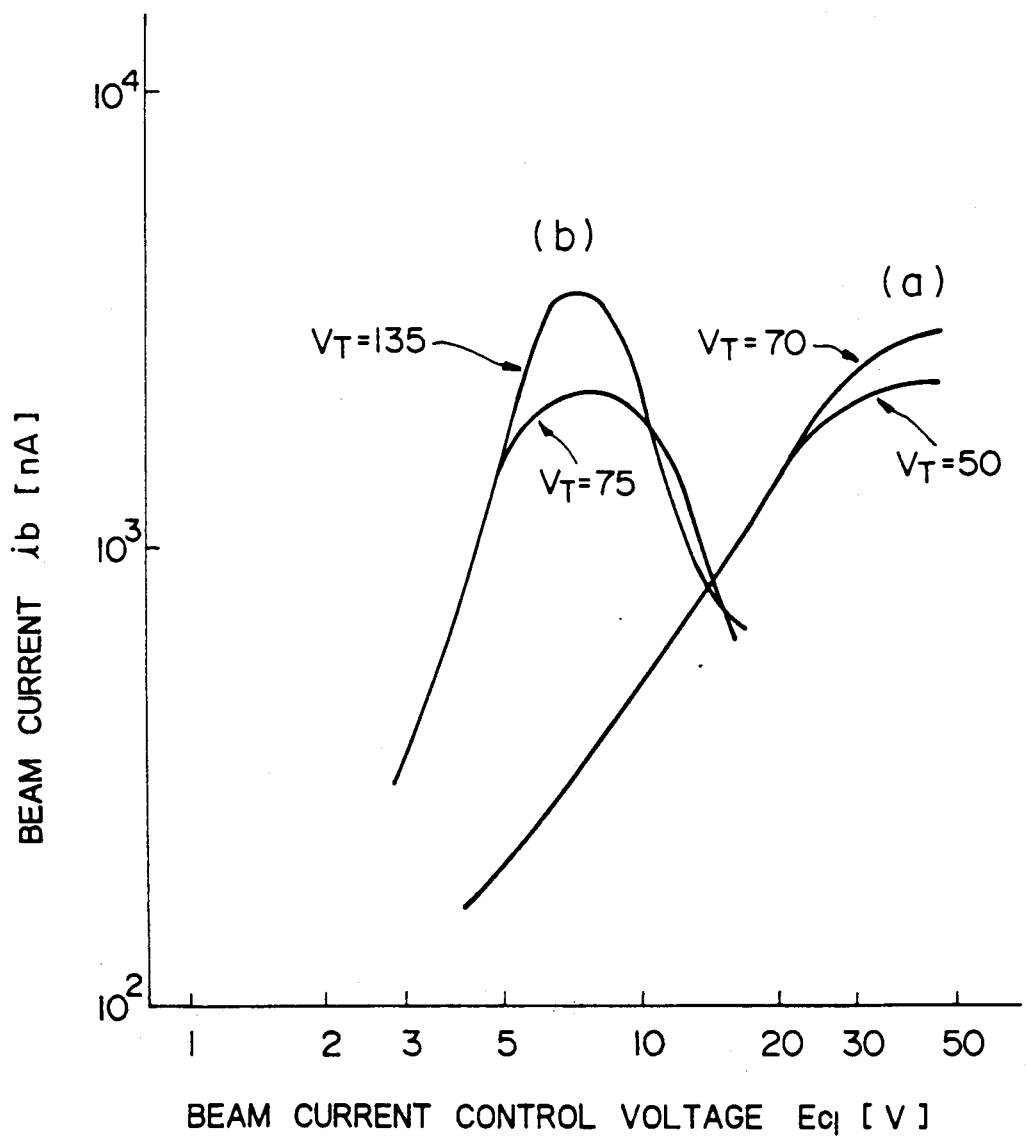

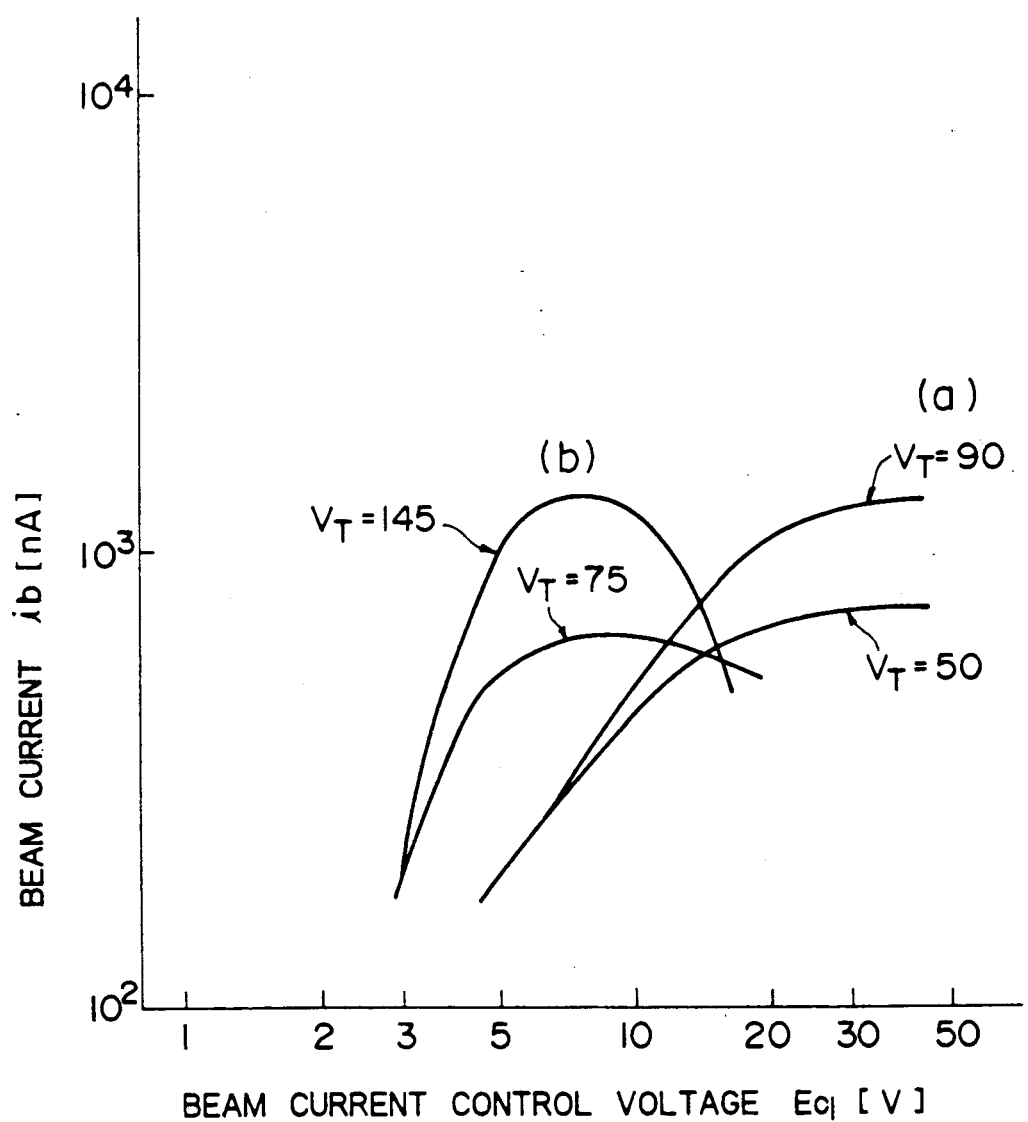

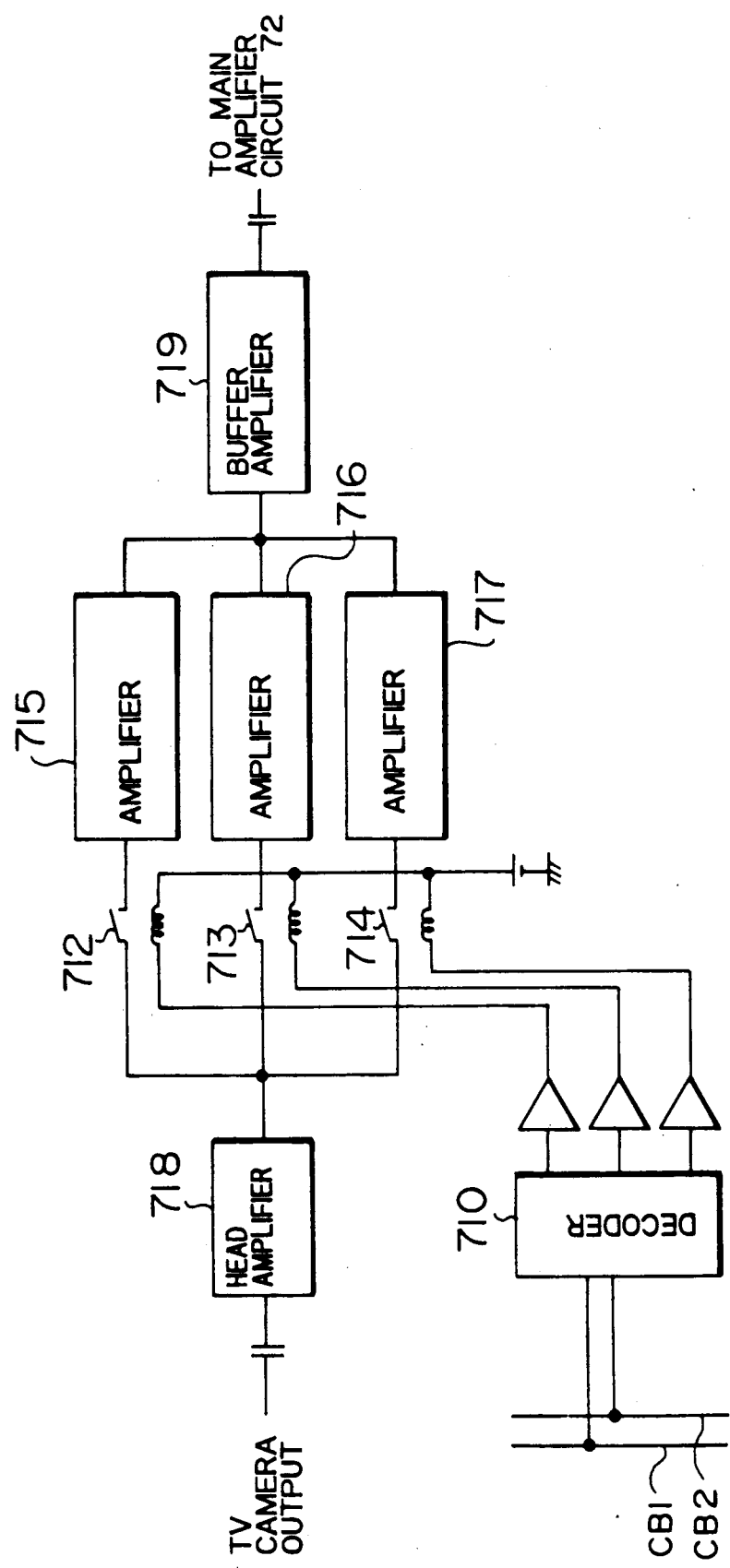

MULTIPLE-MODE SCANNING AND BEAM CURRENT CONTROL X-RAY TV APPARATUS

BACKGROUND OF THE INVENTION

The present invention relates to an X-ray apparatus for medical use, and more particularly to a real-time digital radiographic apparatus (hereinafter referred to as real-time DR apparatus) in which a television (TV) camera device is used as an image input device to pick up an X-ray image in real time and the X-ray image is processed to make a diagnosis.

In many regions of the field of recent X-ray diagnosis apparatuses for medical use are utilized with a DR apparatus in which an X-ray image is subjected to a digital image processing after conversion thereof into an electrical signal and subsequent A/D conversion of the electrical signal and is then displayed on a CRT display or printed on a photographic film to make a diagnosis.

Especially, the combination of a TV camera device and an X-ray image intensifier (hereinafter referred to as X-ray II) used for reducing an X-ray dose rate per one image or frame and for acquiring a fluoroscopic image mainly utilized to determine a location to be imaged has been remarked for a long time as an image input device for a DR apparatus since the combination makes it possible to conveniently convert X-ray image information into an electrical signal in real time. In recent years, such a combination has been widely utilized at the scene of labor in medical care as an image input device for a digital fluorographic apparatus (DF apparatus) which is one kind of real-time DR apparatus and in which a subtraction operation between images picked up before and after the injection of a contrast agent into a blood vessel is performed to depict an angiography having an excellent contrast resolution, as has been disclosed by U.S. Pat. No. 4,204,225.

In other words, a DR apparatus needs both the above-mentioned fluoroscopic image and a radiographic image which is an X-ray image of better image quality obtained with the X-ray dose rate per one frame enhanced to about 1000 times as high as that upon fluoroscopic monitoring and which a doctor observes to make a diagnosis.

U.S. application Ser. No. 220,978 filed on July 18, 1988 by applicants which are partially overlapped by the applicants of the present application, has proposed an X-ray TV device capable of selecting one of a plurality of imaging modes between which each of the spatial resolution or the number of scanning lines per one frame and the frame rate is different.

On the other hand, the present application has a relevancy to U.S. application Ser. No. 356,419 filed on May 25, 1989 by applicants a part of which are the same as the applicants of the present application and assigned to the assignee of the present application. This U.S. Application has proposed an X-ray TV device in which an image pickup tube is used within a range of target voltages which cause avalanche multiplification useful for improving the sensitivity of a TV camera and an X-ray TV device in which a target voltage upon fluoroscopic monitoring and a target voltage upon radiographic imaging differ from each other so that avalanche multiplification is produced only upon fluoroscopic monitoring and is not produced upon radiographic imaging.

Also, JP-A-60-180284 laid open on 1985 has proposed an X-ray TV camera device in which a target voltage of an image pickup tube is changed in accordance with an X-ray dose rate.

SUMMARY OF THE INVENTION

In a TV camera device having a plurality of scanning modes, the maximum signal current derivable from an image pickup tube in a scanning mode involving a large number of scanning lines and a low frame rate or in a scanning mode involving a high spatial resolution and a low time resolution is reduced as compared with that in a scanning mode in which an image having a low spatial resolution is obtained at a high frame rate, as is described in the above-mentioned U.S. application Ser. No. 220,978. Therefore, in the scanning mode involving a high spatial resolution, there occurs a phenomenon that the S/N ratio and dynamic range of an image are deteriorated as compared with those in the imaging mode involving a low spatial resolution.

When there is enough incident light, the maximum signal current derivable from an image pickup tube depends upon a target voltage $V_T$. However, as a high target voltage is applied, the lifetime of the target is shortened. The change of a target voltage as described in the above-mentioned JP-A-60-180284 is advantageous in view of the lifetime of the target as compared with the case where a target voltage is kept at a high level. But, in a DR apparatus, a change-over between two modes including a fluoroscopic monitoring mode and a radiographic imaging mode is frequently carried out with the X-ray dose rate being changed. In the case where the target voltage is changed in accordance with the change of the X-ray dose rate, a certain time is required from the change of the target voltage until the operation of the image pickup tube is stabilized. As a result, the through-put and availability factor of the DR apparatus are lowered.

Accordingly, an object of the present invention is to provide a radiographic apparatus capable of obtaining sufficient S/N ratio and sufficient dynamic range of an image even in a radiographic imaging mode in which the spatial resolution is high and the frame rate is low and to provide an image input device used in such a radiographic apparatus.

Another object of the present invention is to provide a digital radiographic apparatus in which the shortening of the lifetime of a target of an image pickup tube is minimized and the lowering of the availability factor of the apparatus is small and to provide an image input device used in such a digital radiographic apparatus.

One feature of the present invention lies in that in a TV camera device having a plurality of scanning modes which are included as scanning operations established for the TV camera device and between which each of the frame rate and the number of scanning lines per one frame is different, a target voltage $V_T$ of an image pickup tube in a certain scanning mode involving a higher spatial resolution or a larger number of scanning lines per one frame and a lower frame rate is made higher than that in another scanning mode involving a lower spatial resolution or a smaller number of scanning lines per one frame and a higher frame rate.

More particularly, a target voltage higher than a standard target voltage designated for a beam scanning in a television standard is used in a scanning mode in which an electron beam is scanned at a slow beam scanning speed on scanning lines closer than those in the television standard to realize 1000 or more scanning lines per one frame or 2000 or more scanning lines per one frame. This is based on the present inventors' revealed fact that in a scanning mode in which the number of scanning lines and the frame rate $N_F$ are equivalent to those in the television standard, the maximum signal current derivable from an image pickup tube is obtained with a substantially satisfactory value at the standard target voltage but the value of the maximum derivable signal current exhibits no substantial change with the increase of the target voltage $V_T$ whereas in a scanning mode involving a larger number of scanning lines and a lower frame rate, the value of the maximum derivable signal current which was not sufficient under application of the standard target voltage is increased as the target voltage $V_T$ is increased.

There may be the case where it is necessary to change over a voltage $E_{C1}$ of a beam current control electrode $GD_1$ of the image pickup tube for each scanning mode in order to set the actual beam current $i_b$ to a proper value. Also, there may be the case where it is necessary to change over a focusing control current supplied to a focusing coil of the image pickup tube for each scanning mode.

According to another feature of the present invention, a real-time digital radiographic apparatus in which a real-time X-ray image of an object converted into an optical image is picked up by a TV camera device. First change-over means are produced for making a change-over between a radiographic imaging mode in which a radiographic image for diagnosis is obtained and a fluoroscopic monitoring mode in which a real-time fluoroscopic image used for the determination of a position imaged in the radiographic imaging mode is obtained by picking up by means of the TV camera device an image acquired under an X-ray dose rate lower than that in the radiographic imaging mode. Second change-over means are also provided for making a change-over between a plurality of scanning modes in the radiographic imaging mode in which each of the frame rate and the number of scanning lines per one frame is different, and target voltage control means for selecting a target voltage of an image pickup tube of the TV camera device irrespective of an output of the first change-over means but in accordance with an output of the second change-over means so that a target voltage corresponding to a scanning mode designated by the second change-over means is applied to a target of the image pickup tube no matter whether the apparatus is in operation under the fluoroscopic monitoring mode or the radiographic imaging mode. With this construction, even if the change-over between the fluoroscopic monitoring mode and the radiographic imaging mode is frequently carried out, the target voltage $V_T$ is kept constant or unchanged so long as the change-over by the second change-over means is not made. This minimizes the lowering of the availability factor of the apparatus due to a wait time until the operation of the image pickup tube is stabilized after the change of the target voltage $V_T$.

Further features of the present invention will become apparent when reading detailed description of embodiments of the present invention.

BRIEF DESCRIPTION OF THE DRAWINGS

FIGS. 3A to 3D are graphs showing the results of measurement of the beam current characteristics of two image pickup tubes for different scanning modes; and FIGS. 4, 5 and 6 are circuit diagrams of a target voltage controller, a beam current controller and a pre-amplifier circuit shown in FIG. 2, respectively.

DESCRIPTION OF THE PREFERRED EMBODIMENTS

Figure 1:
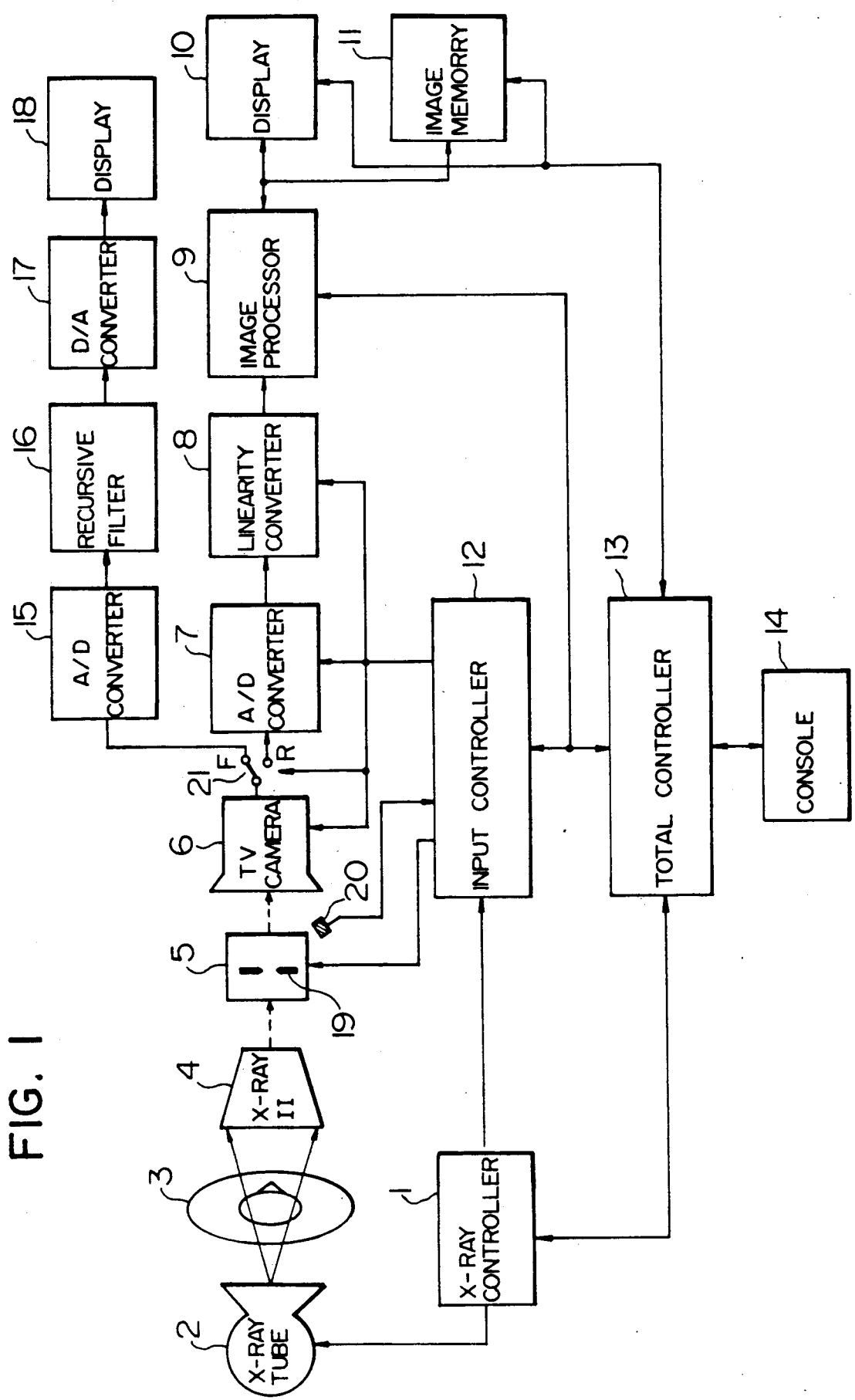
FIG. 1 is a block diagram showing the whole construction of a real-time DR apparatus according to an embodiment of the present invention.

FIG. 1 is a block diagram of a real-time DR apparatus according to an embodiment of the present invention. An object 3 to be inspected is irradiated with X-rays generated from an X-ray tube 2. The dose rate of X-rays is controlled by an X-ray controller 1. An X-ray image intensifier (X-ray II) 4 converts an X-ray image transmitted through the object 3 into an optical image. The optical image is focused onto a TV camera 6 by virtue of an optical lens system 5. The optical lens system 5 is provided with an iris or diaphragm 19 for adjusting the amount of light incident upon the TV camera 6 and a light detector 20 for measuring the amount of incident light. The TV camera 6 has four scanning modes between which each of the frame rate and the number of scanning lines or the scanning method (or system) is different. A first mode of the four scanning modes employs a beam scanning which corresponds to or resembles an NTSC system or which involves the frame rate of 30 frame/second, 525 scanning lines per one frame and a 2:1 (two fields per one frame) interlace system. In the first scanning mode, the DR apparatus performs a fluoroscopic monitoring mode in which an image obtained through continuous irradiation with a lower X-ray dose rate is monitored in real time. At this time, a signal path selection switch 21 selects a contact F. Thereby, a video signal from the TV camera 6 is supplied to an A/D converter 15 and is thereafter supplied to a display 18 for fluoroscopic monitoring through a recursive filter 16 and a D/A converter 17. The recursive filter 16 is provided for attaining a proper after-image characteristic so as to prevent an image on the display 18 from flickering. For the purpose of simplification of the system, the system may be constructed such that the video signal on the contact F side of the switch 21 is supplied directly to the display 18.

On the other hand, each of second, third and fourth scanning modes belongs to a radiographic imaging mode in which a radiographic image capable of being used for diagnosis is obtained by picking up an image acquired under an X-ray dose rate higher than that in the fluoroscopic monitoring mode. In these modes, the switch 21 selects a contact R. Thereby, a video signal from the TV camera 6 is converted into a digital signal by an A/D converter 7 and is thereafter supplied to an image processor 9 through a linearity converter 8. In the linearity converter 8, correction for the gamma ($\gamma$) characteristic of an image pickup tube and data correction including the conversion of linear data into logarithmic data are performed in a look-up table manner. The image processor 9 performs a control necessary for displaying or storage of an image signal in accordance with a command from a total controller 13. Thereby, the displaying of an image by a display 10 or the storage of an image by an image memory 11 is effected.

A console 14 is provided with various control switches including a switch for designating any one of the fluoroscopic monitoring mode and the radiographic imaging mode, a switch for selecting any one of the second, third and fourth scanning modes in the radiographic imaging mode, a switch for designating the conditions of data correction, a switch for indicating the storage of an image in the image memory 11, a switch for designating the X-ray dose rate, and so on. The total controller 13 issues commands to respective parts in accordance with selections by those switches.

First, explanation will be made of a command to the X-ray controller 1 and a control of the amount of light incident upon the TV camera 6 related thereto. When the fluoroscopic monitoring mode is selected by the mode designating switch in the console 14, the total controller 13 gives instructions in a reference value (for example, 1 μR per image) of the X-ray dose rate for the fluoroscopic monitoring mode to the X-ray controller 1. In the radiographic imaging mode, one of two or three kinds of X-ray dose rates can be selected by the X-ray dose rate designating switch in the console 14. The X-ray dose rate selected in the radiographic imaging mode is within a range of values which are, for example, 20 to 1000 times as high as the reference value of the X-ray dose rate for the fluoroscopic monitoring mode. The total controller 13 gives instructions in the thus selected X-ray dose rate to the X-ray controller 1 on one hand and designates the opening or aperture of the diaphragm 19 corresponding to the selected X-ray dose rate on the other hand to provide a command to an input controller 12. The input controller 12 makes a programmed control of the aperture of the diaphragm 19 in accordance with this command. The input controller 12 has a table in which reference values of the amount of light incident upon the TV camera corresponding to the respective values of X-ray dose rates to be designated are stored. The input controller 12 further has a feedback controller for generating a control signal for adjustment of the X-ray dose rate and supplying it to the X-ray controller 1 so that the light amount measured by the light detector 20 becomes equal to the reference value read out of the above-mentioned table. Namely, the X-ray dose rate assumes a reference value for X-ray dose rate selected by the console 14 but takes a value which is adjusted so as to make the amount of light incident upon the TV camera equal to a reference value for incident light amount corresponding to the selected dose rate.

The maximum and minimum values among the designated X-ray dose rates have a difference of 1000 times therebetween. Accordingly, even if the programmed control of the aperture of the diaphragm is employed, the maximum and minimum values among the reference values of the incident light amount corresponding to the X-ray dose rates or the maximum and minimum values of the amount of light incident upon the TV camera actually adjusted through the feedback control have a difference of about 50 to 100 times therebetween.

Next, explanation will be made of the details of the scanning modes and a control for the TV camera 6.

As shown in Table 1, in the first mode or the fluoroscopic

TABLE 1

| SCANNING MODE | NUMBER OF SCANNING LINES | FRAME RATE | SCANNING SYSTEM | NUMBER OF PIXELS |
|---|---|---|---|---|
| 1ST | 525 LINES | 30 FRAME/SEC | 2:1 INTERLACE | 480 × 512 |
| 2ND | 525 LINES | 60 FRAME/SEC | NON-INTERLACE | 512 × 512 |
| 3RD | 1050 LINES | 15 FRAME/SEC | NON-INTERLACE | 1024 × 1024 |
| 4TH | 2100 LINES | 3.75 FRAME/SEC | NON-INTERLACE | 2048 × 2048 | monitoring mode in which a fluoroscopic image is displayed on the display 18, there is performed a beam scanning in which the number of scanning lines per one frame is 525, the frame rate is 30 frame/sec and a 2:1 (two fields per one frame) interlace system is employed, that is, a scanning which corresponds to or resembles the NTSC system. The number of pixels per one frame sampled by the A/D converter 15 is 480×512. Each of the second, third and fourth modes is a radiographic imaging mode and a beam scanning based on a non-interface system is employed in these modes. Though an effective scan area of the TV camera is the same for the second, third and fourth modes, the number of scanning lines is 525 for the second mode, 1050 for the third mode and 2100 for the fourth mode and the frame rate is 60 frame/sec for the second mode, 15 frame/sec for the third mode and 3.75 frame/sec for the fourth mode. Namely, the second mode is a mode having a preference to the time resolution and has 512×512 pixels. The fourth mode is a mode having a preference to the spatial resolution and has 2048×2048 pixels. The third mode is an intermediate mode between the second and fourth modes and has 1024×1024 pixels.

Figure 2:
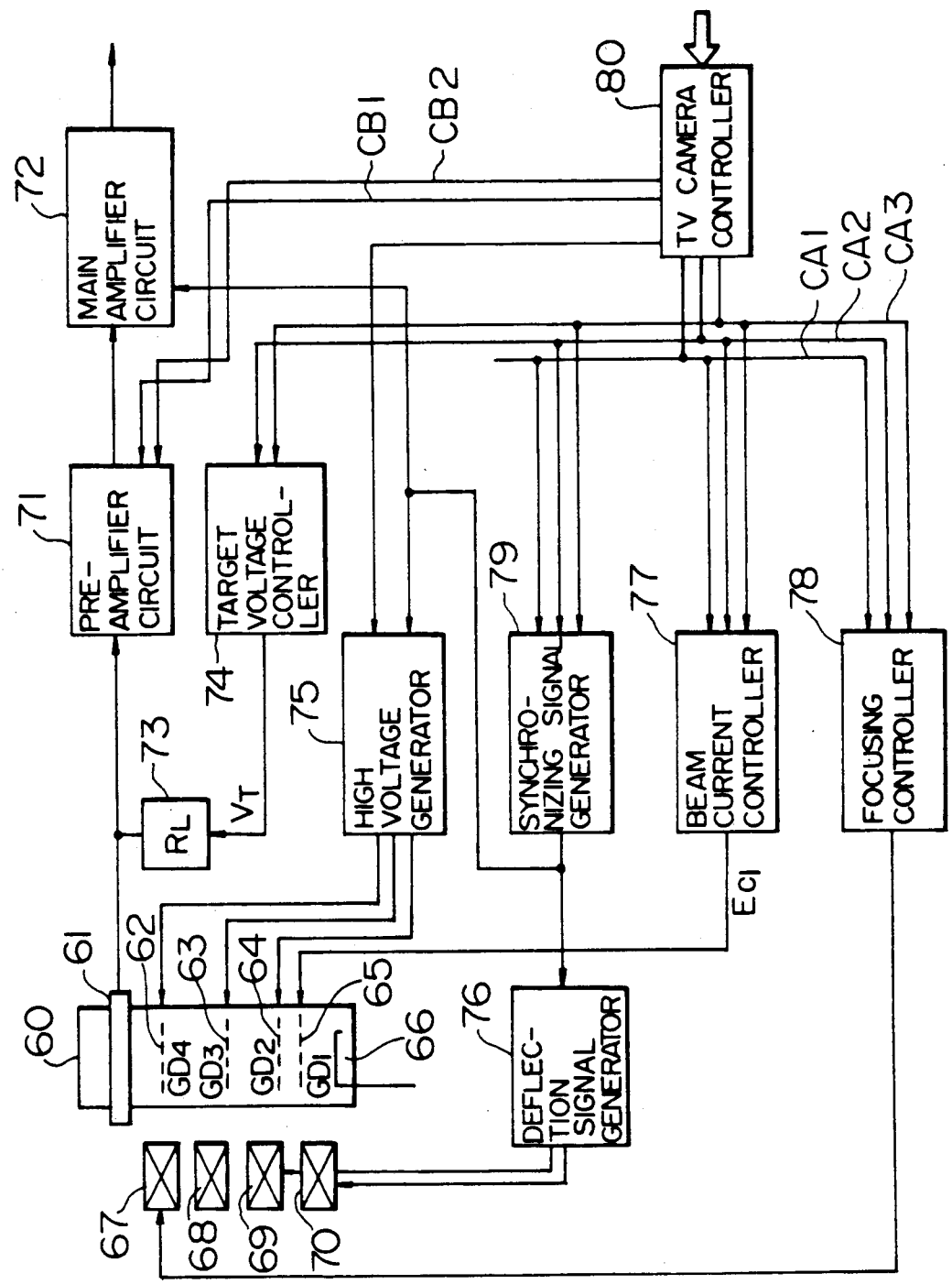
FIG. 2 is a block diagram of a TV camera in the apparatus shown in FIG. 1.

FIG. 2 shows a block diagram of the TV camera 6 in the embodiment shown in FIG. 1. In FIG. 2, reference numeral 60 designates a 1-inch image pickup tube of a magnetic focusing and magnetic deflection type (hereinafter referred to as M-M type) having a blocking type photoconductive layer, numeral 61 a target ring, numeral 62 a mesh electrode $GD_4$, numeral 63 a beam focusing electrode $GD_3$, numeral 64 an accelerating electrode $GD_2$, numeral 65 a beam current control electrode $GD_1$, numeral 66 a cathode, numeral 67 a focusing coil, numeral 68 an alignment coil, numeral 69 a horizontal deflection coil, and numeral 70 a vertical deflection coil. A target voltage $V_T$ generated at a target voltage controller 74 is supplied to the target ring 61 through a load resistance ($R_L$) 73. Voltages necessary for the electrodes $GD_4$, $GD_3$ and $GD_2$ are supplied from a high voltage generator 75. The beam control electrode $GD_1$ is supplied with a control voltage $E_{C1}$ generated at a beam current controller 77. The fosucing coil 67 is supplied with a focusing control current supplied from a focusing controller 78. Based on a synchronizing signal supplied from a synchronizing signal generator 79, a deflection signal generator 76 generates deflection signals for beam scanning to supply them to the horizontal deflection coil 69 and the vertical deflection coil 70. An output of the image pickup tube 60 is amplified by a pre-amplifier circuit 71 and a main amplifier circuit 72 and is outputted as a video signal from the main amplifier circuit 72. A TV camera controller 80 supplies control signals to various parts in accordance with a command given from the total controller 13 through the input controller 12. More particularly, control signals $CA_1$, $CA_2$ and $CA_3$ are control signals indicative of the designated modes. The control signal $CA_1$ indicates either the fluoroscopic monitoring mode or the radiographic imaging mode. The control signals $CA_2$ and $CA_3$ indicate which of the second, third and fourth modes (shown in Table 1) in the radiographic mode is designated. Control signals $CB_1$ and $CB_2$ make a distinction of the designated X-ray dose rates.

The synchronizing signal generator 79 decodes all of the control signals $CA_1$ to $CA_3$ to generate a synchronizing signal which effects a beam scanning in the designated one of the modes shown in Table 1. Similarly, the beam current controller 77 and the focusing controller 78 selectively generate a beam current control voltage and a focusing control current which correspond to the designated mode. On the other hand, the target voltage controller 74 generates a target voltage $V_T$ in accordance with the contents of the control signals $CA_2$ and $CA_3$. This will now be explained in detail by virtue of FIGS. 3A to 3D.

Figure 3A:
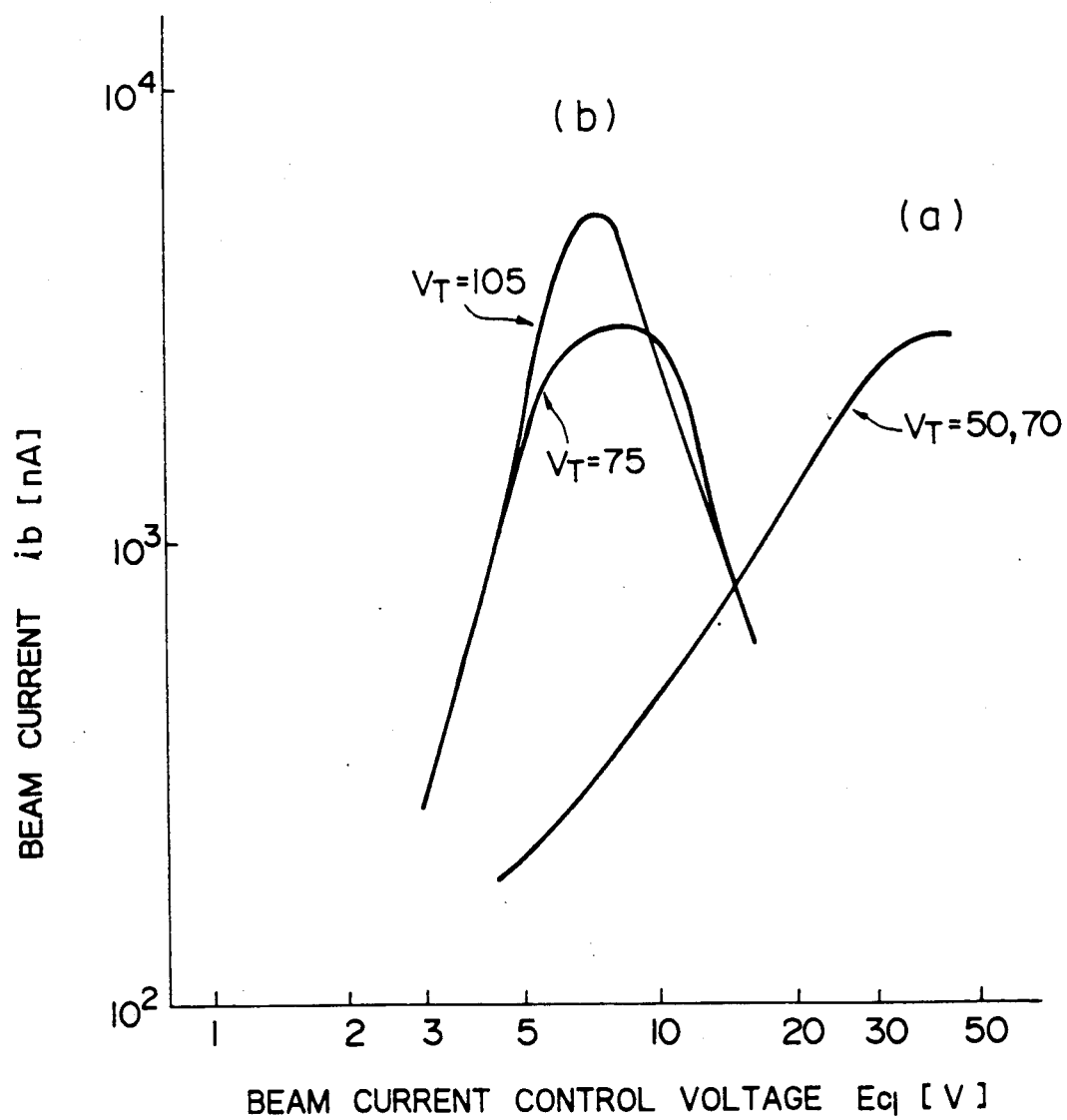
Figure 3B:
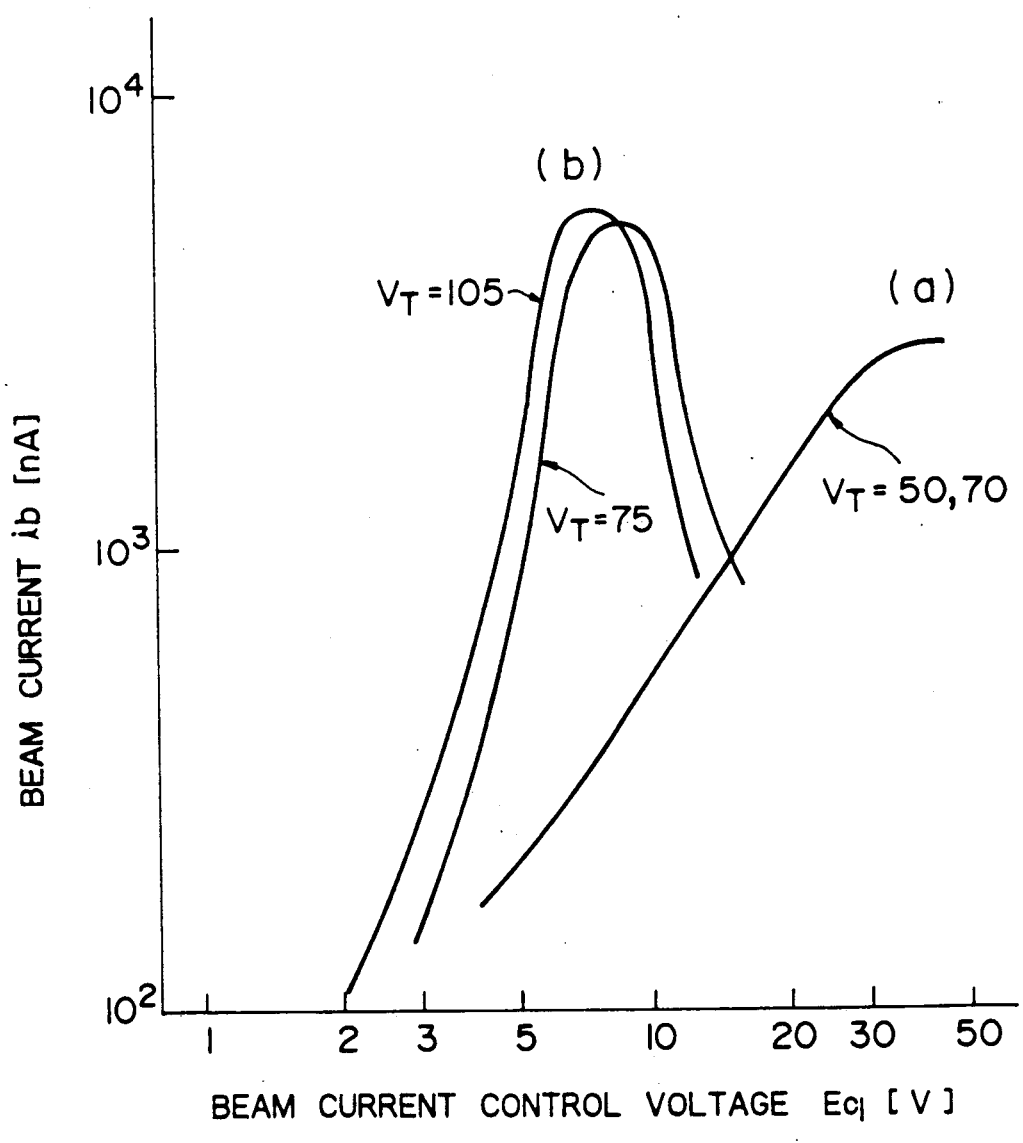

FIGS. 3A to 3D show the results of measurement of beam current control voltage $E_{C1}$ versus maximum derivable signal current (or so-called signal current $i_b$) characteristics of two image pickup tubes and of settled standard target voltage values of 50 volts and 75 volts with a target voltage $V_T$ being taken as a parameter. FIG. 3A corresponds to the first scanning mode shown in Table 1 or the scanning with 525 scanning lines resembling the NTSC system, FIG. 3B corresponds to the second scanning mode (525 scanning lines and non-interface system), FIG. 3C corresponds to the third scanning mode (1050 scanning lines), and FIG. 3D corresponds to the fourth scanning mode (2100 scanning lines). From comparison of the characteristics of the image pickup tube of the settled standard target voltage value of 50 volts shown by (a) in FIGS. 3A to 3D, it is seen that the peak value of the maximum signal current or the peak value of $i_b$ in the third and fourth scanning modes is lower than that in the first and second scanning modes when the target voltage $V_T$ is 50 volts. Especially, the fourth scanning mode having the most number of scanning lines and the slowest scanning speed exhibits the peak value of $i_b$ which is about one third of that in the first and second scanning modes. When the target voltage $V_T$ is made higher than the standard value of 50 volts, the first and second scanning modes have no change of the peak value of $i_b$. On the other hand, the peak value of $i_b$ in the third and fourth scanning modes is increased when $V_T$ is made higher. This effect is remarkable in the fourth scanning mode. The same mentioned above can be said for the characteristics of the image pickup tube of the settled standard target voltage value of 75 volts shown by (b) in FIGS. 3A to 3D. As the target voltage of an image pickup tube is raised, the lifetime of the target is correspondingly shortened. Accordingly, if means for making a change-over between the scanning modes shown in Table 1 is constructed such that a standard target voltage is used in the first and second scanning modes having higher scanning speeds while target voltages successively higher than the standard target voltage are respectively used in the third and fourth scanning modes, there can be obtained an apparatus in which the lowering of the maximum derivable signal current in the third and fourth scanning modes is less or an output having a wide dynamic range is always attained and the lowering of the lifetime of the target is minimized. However, in an X-ray radiographic apparatus, a change-over between the fluoroscopic monitoring mode and the radiographic imaging mode rather than a change-over between scanning modes (or the second, third and fourth scanning modes) in the radiographic imaging mode is frequently made. On the other hand, when the target voltage $V_T$ of the image pickup tube is changed, the operation of the image pickup tube is unstable immediately after the change and a certain time is required until the operation is stabilized.

Figure 4:
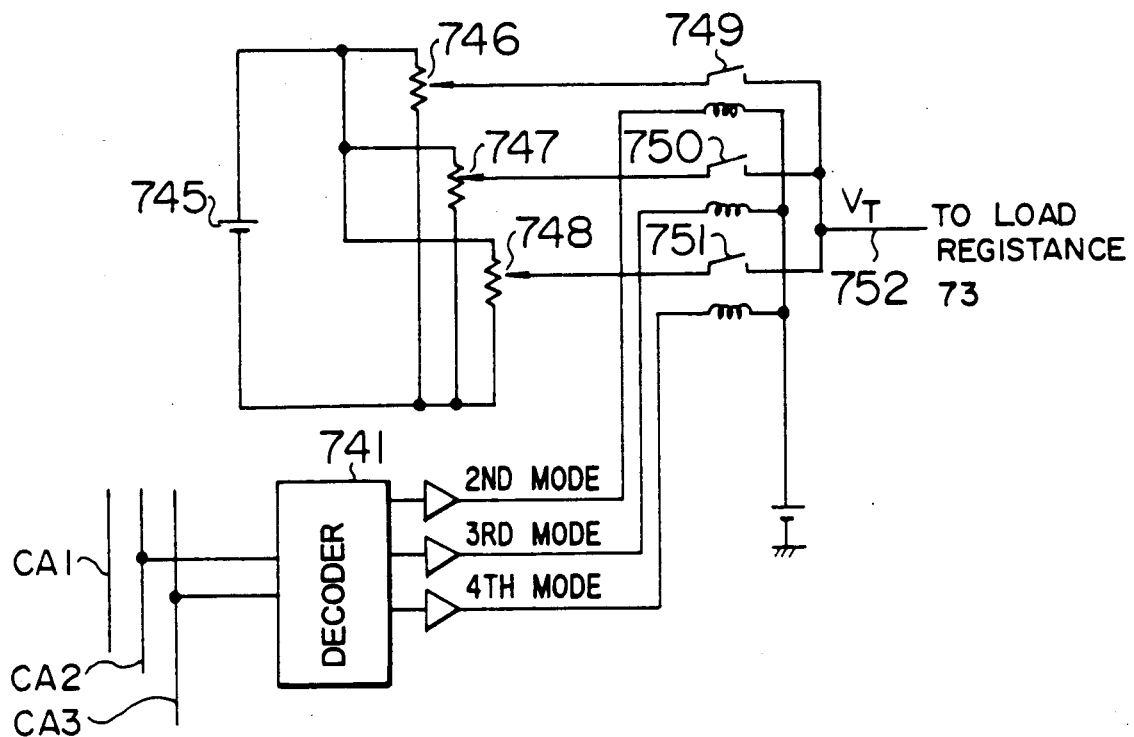

In the apparatus according to the present embodiment taking the above into consideration, the value of $V_T$ is controlled in accordance with which of the second, third and fourth scanning modes in the radiographic imaging mode is designated but is not changed for the change-over to the fluoroscopic monitoring mode. FIG. 4 shows a specific example of the construction of the target voltage controller 74 for performing such change-over of $V_T$. Referring to FIG. 4, a decoder 741 decodes only $CA_2$ and $CA_3$ among the control signals $CA_1$ to $CA_3$ to generate an output. Namely, the output of the decoder 741 indicates which of the second, third and fourth scanning modes in the radiographic imaging mode is selected by the mode selecting switch in the console 14 no matter whether a mode being carried out is the fluoroscopic monitoring mode or the radiographic imaging mode. Potentiometers 746, 747 and 748 connected to a power source 745 are adjusted to generate target voltages $V_T$ which are adapted to the second, third and fourth scanning modes, respectively. One of switches 749, 750 and 751 is closed by the output of the decoder 741 so that a target voltage $V_T$ to be applied from an output terminal 752 to the load resistance 73 (see FIG. 2) is selected. For example, in the case where the image pickup tube having the characteristics shown by (a) in FIGS. 3A to 3D is used, the target voltage $V_T$ is set to 50 volts for the second scanning mode, 70 volts for the third scanning mode and 90 volts for the fourth scanning mode.

Figure 5:
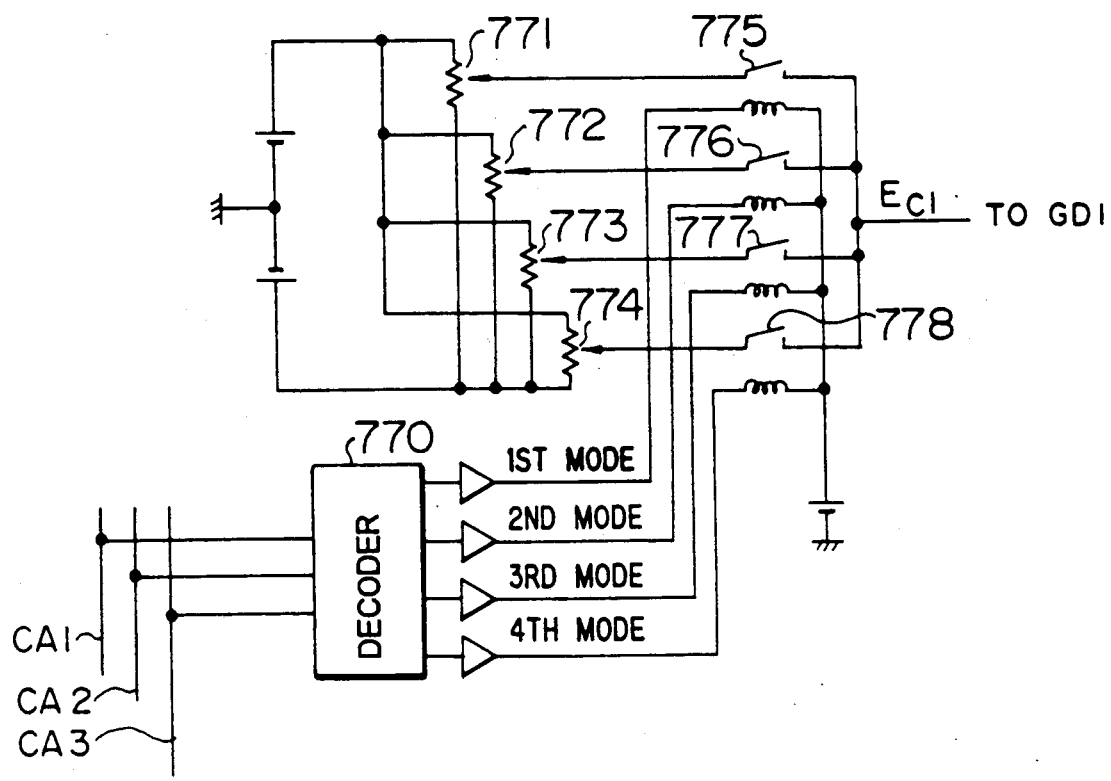

FIG. 5 shows a specific example of the construction of the beam current controller 77 shown in FIG. 2. As shown in FIGS. 3A to 3D, the value of a beam current control voltage $E_{C1}$ providing the peak value of $i_b$ is different between the first to fourth scanning modes. Accordingly, in the present embodiment, the circuit is constructed such that values of $E_{C1}$ adapted to the respective scanning modes can be individually set by potentiometers 771 to 774. A decoder 770 decodes the contents of the control signals $CA_1$ to $CA_3$ to generate an output so that one of switches 775 to 778 is closed to select the value of $E_{C1}$ corresponding to the designated mode. Table 2 shows the values of the target voltage $V_T$ and beam current control voltage $E_{C1}$ of the image pickup tubes having the characteristics (a) and (b) shown in FIGS. 3A to 3D which are adapted to the respective scanning modes.

TABLE 2

| IMAGE PICKUP TUBE | SCANNING MODE | TARGET VOLTAGE ($V_T$) | BEAM CURRENT ($i_b$) | BEAM CURRENT CONTROL VOLTAGE ($E_{C1}$) |
| --- | --- | --- | --- | --- |
| (a) | 1ST | EQUAL TO ONE OF | — | 30 V |

TABLE 2-continued

| IMAGE PICKUP TUBE | SCANNING MODE | TARGET VOLTAGE ($V_T$) | BEAM CURRENT ($i_b$) | BEAM CURRENT CONTROL VOLTAGE ($E_{Cl}$) |
|---|---|---|---|---|
| | | 2ND, 3RD AND 4TH MODES | | |
| | 2ND | 50 V | 2.6 mA | 30 V |
| | 3RD | 70 V | 2.6 mA | 30 V |
| | 4TH | 90 V | 1.15 mA | 30 V |
| (b) | 1ST | EQUAL TO ONE OF 2ND, 3RD AND 4TH MODES | — | 7.5 V |
| | 2ND | 75 V | 5.0 mA | 7.0 V |
| | 3RD | 135 V | 3.4 mA | 6.5 V |
| | 4TH | 145 V | 1.2 mA | 6.0 V |

Since the selection of the values of $V_T$ and $E_{Cl}$ as shown above makes it possible to set the maximum signal current to a large value even in the third and fourth scanning modes having a higher resolution and a lower frame rate, the dynamic range of an image signal becomes wider even in these modes. Further, since the frequency in change of $V_T$ is not high, a long wait time is not required for stabilization of the operation and hence it is possible to obtain a digital radiographic apparatus in which the effective operating time is long. If the designation of $V_T$ is made individually for the four modes shown in Table 1, the frequency in change of $V_T$ becomes higher but such a destination is more advantageous in view of the lifetime of the target of the image pickup tube. As can be understood from the characteristics (a) shown in FIGS. 3A to 3D, the value of $E_{Cl}$ may be kept unchanged if a proper kind of image pickup tube is used.

As has been mentioned above, in the digital radiographic apparatus according to the present embodiment, the maximum and minimum values among the designated X-ray dose rates have a large difference therebetween and hence the maximum and minimum values among the amounts of light incident upon the TV camera have a difference of about 50 to 100 times therebetween even if the programmed control of the aperture of the diaphragm is employed. Therefore, the gain of the preamplifier circuit 71 (see FIG. 2) is changed in accordance with the designated X-ray dose rate so that the peak level of a video signal outputted to the A/D converter 7 or 15 is substantially kept constant. FIG. 6 shows a specific circuit diagram of the pre-amplifier circuit 71. A decoder 710 decodes the contents of the control signals $CB_1$ and $CB_2$ indicative of the designated values of X-ray dose rate so that one of switches 712, 713 and 714 is closed. Thereby, an output of the TV camera through a head amplifier 718 is applied to one of amplifiers 715, 716 and 717 which have different gains. An output of the selected one of the amplifiers 715, 716 and 717 is supplied through a buffer amplifier 719 to the main amplifier circuit 72 (see FIG. 2) which in turn provides a video signal having a predetermined peak value. When the fluoroscopic monitoring mode is designated by the mode designating switch in the console 14, the control signals $CB_1$ and $CB_2$ are automatically set to values which designate an X-ray dose rate corresponding to that mode. Therefore, the gain of the pre-amplifier circuit 71 is also changed by a change-over between the fluoroscopic monitoring mode and the radiographic imaging mode. In general or in many cases, the change of the gain of an amplifying circuit relies on the change of the amount of attenuation of an attenuator or the change of the amount of feedback of a single amplifier. In the former case or when the change of the amount of attenuation of the attenuator is made, the problems of deterioration of S/N ratio and/or deterioration of the dynamic range are liable to arise due to the insertion level of the attenuator. On the other hand, in the latter case or when the change of the amount of feedback of the single amplifier is made, the GB (gain-bandwidth) product of the amplifier becomes constant and hence the deficiency of a frequency band is liable to be caused when a lower X-ray dose rate or a higher gain is required. On the contrary, in the present embodiment in which the plurality of amplifiers are used in a change-over manner, the above-mentioned problems do not arise since the individual amplifiers can be provided with their required performances or characteristics. A part of the amplifiers 715, 716 and 717 may be replaced by an attenuator(s).

In the foregoing, the embodiment of a real-time digital radiographic apparatus has been described in which an image signal having a wide dynamic range and a high S/N ratio can be obtained no matter which of a plurality of scanning modes or a plurality of X-ray dose rates is selected. But, the present invention is not limited to a digital radiographic apparatus. The present invention is applicable to a TV camera device in which a change-over is made between a plurality of scanning modes different in the number of scanning lines and the frame rate from each other or a TV camera device in which the amount of incident light has a large change in level.

We claim:

1. A radiographic apparatus comprising:
   image conversion means for converting an X-ray image into an optical image;
   an image pickup tube disposed to be coupled with said image conversion means for picking up said optical image;
   beam scanning control means for selectively performing one of a plurality of modes which are included as beam scanning modes for said image pickup tube and between each of said plurality of modes the number of scanning lines per one frame and the frame rate per unit time is different;
   mode selection means for designating one of said plurality of modes; and
   target voltage control means including setting means for setting a target voltage of said image pickup tube for each of said plurality of modes, said target voltage control means applying to a target of said image pickup tube a target voltage which corresponds to the mode designated by said mode selection means.

2. A radiographic apparatus comprising:

image conversion means for converting an X-ray image into an optical image;

an image pickup tube disposed to be coupled with said image conversion means for picking up said optical image;

beam scanning control means for selectively performing at least first and second scanning modes which are included as beam scanning modes for said image pickup tube, said first scanning mode having a predetermined number of scanning lines per one frame and a first predetermined frame rate per unit time, said second scanning mode having scanning lines the number of which is larger than said first predetermined number of scanning lines per one frame and a frame rate which is lower than said first predetermined frame rate;

mode selection means for designating one of said first and second scanning modes; and target voltage control means for controlling a target voltage of said image pickup tube so that said target voltage when said second scanning mode is designated is made higher than that when said first scanning mode is designated.

3. A radiographic apparatus comprising:

image conversion means for converting an X-ray image into an optical image;

an image pickup tube disposed to be coupled with said image conversion means for picking up said optical image;

beam scanning control means for selectively performing at least first and second scanning modes which are included as beam scanning modes for said image pickup tube, said first scanning mode having a predetermined number of scanning lines per one frame and a predetermined frame rate per unit time, said second scanning mode having scanning lines the number of which is larger than said predetermined number and a frame rate which is lower than said predetermined frame rate;

mode selection means for designating one of said first and second scanning modes; and target voltage control means for controlling a target voltage of said image pickup tube so that the target voltage when said second scanning mode is designated is made higher than that when said first scanning mode is designated.

4. A radiographic apparatus according to claim 3, further comprising beam current control means for controlling a beam current control voltage of said image pickup tube in accordance with the mode designated by said mode selection means.

5. A radiographic apparatus comprising:

X-ray generation means for generating X-rays toward an object to be inspected;

image conversion means disposed on the other side of said object from said X-ray generation means for converting an X-ray image into an optical image;

an image pickup tube disposed to be coupled with said image conversion means for picking up said optical image;

an amplifying circuit for amplifying an output of said image pickup tube to provide a video signal;

a first output circuit including at least a display device for displaying the video signal inputted thereto;

a second output circuit including at least an analog-to-digital converter for converting the video signal inputted thereto into a digital signal, image processor means for processing said digital signal, and memory means for storing the processed digital signal;

first mode change-over means for designating; (1) a radiographic imaging mode in which an output of said amplifying circuit is provided to said second output circuit to obtain a radiographic image used for observation thereof to make a diagnosis, and (2) a fluoroscopic monitoring mode in which the output of said amplifying circuit is provided to said first output circuit to display a fluoroscopic image in real time on said display device;

second mode change-over means for designating one of a plurality of scanning modes in said radiographic mode between which each of the number of scanning lines per one frame and the frame rate per unit time is different;

beam scanning means for performing a beam scanning for said image pickup tube corresponding to a mode designated by said first and second mode change-over means; and target voltage control means including setting means for setting a target voltage of said image pickup tube for each of said plurality of scanning modes, said target voltage control means applying to said image pickup tube a target voltage corresponding to a mode designated by said second mode change-over means no matter which of said fluoroscopic monitoring mode and said radiographic imaging mode is designated by said first mode change-over means.

6. A radiographic apparatus according to claim 5, wherein at least one of said plurality of scanning modes has scanning lines per one frame the number of which is greater than that in said fluoroscopic monitoring mode and a frame rate per unit time which is lower than that in said fluoroscopic monitoring mode.

7. A radiographic apparatus according to claim 5, wherein at least one of said plurality of scanning modes has scanning lines per one frame the number of which is greater than that in a scanning based on an NTSC system and a frame rate per unit time which is lower than that in the scanning based on the NTSC system, and a set value of the target voltage corresponding to the one scanning mode is higher than a standard value of the target voltage of said image pickup tube.

8. A radiographic apparatus according to claim 5, further comprising beam current control means for controlling a beam current control voltage of said image pickup tube in accordance with each mode designated by said first and second mode change-over means.

9. A radiographic apparatus according to claim 5, further comprising X-ray dose rate change-over means for designating an X-ray dose rate for said object.

10. A radiographic apparatus according to claim 5, further comprising gain selection means for selecting a gain of said amplifying circuit at least in accordance with which of said fluoroscopic monitoring mode and said radiographic imaging mode is designated.

11. A radiographic apparatus according to claim 10, wherein said gain selection means selects the gain by selecting one of a plurality of amplifiers which are prepared for said fluoroscopic monitoring mode and said radiographic imaging mode, respectively.

12. A radiographic apparatus comprising:

X-ray generation means for generating X-rays toward an object to be inspected;

X-ray control means for designating an X-ray dose rate for said object to control the X-rays generated from said X-ray generation means;

image conversion means disposed on the other side of said object from said X-ray generation means for converting an X-ray image into an optical image;

an image pickup tube disposed to be coupled with said image conversion means for picking up said optical image;

scanning means for performing a beam scanning for said image pickup tube;

an amplifying circuit for bringing an output of said image pickup tube into a video signal; and gain selection means for selecting a gain of said amplifying circuit in accordance with the designation of the X-ray dose rate by said X-ray control means.

13. A radiographic apparatus according to claim 12, wherein said gain selection means selects one of a plurality of amplifiers which are prepared for the designated values of the X-ray dose rate.

14. An image input device comprising:
an image pickup tube for picking up an input image;
an amplifying circuit for amplifying an output of said image pickup tube to provide a video signal;
beam scanning control means for selectively performing one of a plurality of modes which are included as beam scanning modes for said image pickup tube and between each of said plurality of modes the number of scanning lines per one frame and the frame rate per unit time is different;
mode selection means for designating one of said plurality of modes; and
target voltage control means including setting means for setting a target voltage of said image pickup tube for each of said plurality of modes, said target voltage control means applying to a target of said image pickup tube a target voltage which corresponds to the mode designated by said mode selection means.

15. An image input device according to claim 14, further comprising beam current control means for controlling a beam current control voltage of said image pickup tube in accordance with the mode designated by said mode selection means.

16. An image input device comprising:
an image pickup tube for picking up an input image;
an amplifying circuit for amplifying an output of said image pickup tube to provide a video signal;
beam scanning control means for selectively performing at least first and second scanning modes which are included as beam scanning modes for said image pickup tube, said first scanning mode having a first predetermined number of scanning lines per one frame and a first predetermined frame rate per unit time, said second scanning mode having scanning lines the number of which is greater than said first predetermined number of scanning lines per one frame and a frame rate which is lower than said first predetermined frame rate;
mode selection means for designating one of said first and second scanning modes; and
target voltage control means for controlling a target voltage of said image pickup tube so that the target voltage when said second scanning mode is designated is made higher than that when said first scanning mode is designated.

17. An image input device according to claim 16, wherein said second scanning mode has scanning lines per one frame the number of which is greater than that in a scanning based on an NTSC system and a frame rate per unit time which is lower than that in the scanning based on the NTSC system, and a value of the target voltage corresponding to said second scanning mode is higher than a standard value of the target voltage of said image pickup tube.

* * * * *